(12) United States Patent
Föll

(10) Patent No.: US 6,850,768 B2
(45) Date of Patent: Feb. 1, 2005

(54) METHOD AND MOBILE COMMUNICATIONS SYSTEM FOR CONTROLLING A SHORT MESSAGE SERVICE

(75) Inventor: Uwe Föll, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 618 days.

(21) Appl. No.: 09/729,065

(22) Filed: Dec. 4, 2000

(65) Prior Publication Data
US 2001/0003094 A1 Jun. 7, 2001

Related U.S. Application Data

(63) Continuation of application No. PCT/DE99/00899, filed on Mar. 24, 1999.

(30) Foreign Application Priority Data

Jun. 2, 1998 (DE) .......................................... 198 24 631

(51) Int. Cl.[7] ................................................ H04Q 7/20
(52) U.S. Cl. .................. 455/466; 455/412.1; 455/414.1
(58) Field of Search .......................... 455/412.1, 414.1, 455/445, 433, 435.1, 466; 340/7.23, 7.53; 370/229, 338, 349; 235/379

(56) References Cited

U.S. PATENT DOCUMENTS

| | | | | |
|---|---|---|---|---|
| 5,577,102 A | * | 11/1996 | Koivunen | 455/433 |
| 6,081,601 A | * | 6/2000 | Raivisto | 380/270 |
| 6,085,100 A | * | 7/2000 | Tarnanen | 455/466 |
| 6,101,393 A | * | 8/2000 | Alperovich et al. | 455/466 |
| 6,161,020 A | * | 12/2000 | Kim | 455/466 |
| 6,263,212 B1 | * | 7/2001 | Ross et al. | 455/466 |
| 6,375,073 B1 | * | 4/2002 | Aebi et al. | 235/379 |

FOREIGN PATENT DOCUMENTS

WO    WO 98/09255    *  5/1998

* cited by examiner

Primary Examiner—Jean Gelin
(74) Attorney, Agent, or Firm—Laurence A. Greenberg; Werner H. Stemer; Ralph E. Locher

(57) ABSTRACT

On the basis of the fact that short messages are sent by a communication terminal of a mobile subscriber into a mobile radio network and are routed to a switching facility responsible for the mobile subscriber, the short message together with an address which identifies a service facility responsible for dealing with the short message service for the mobile subscriber is received by the switching facility. The short messages are routed for temporary storage in the service facility and for transmission to a communication terminal of another subscriber if the received address is contained in an address table of the switching facility.

3 Claims, 2 Drawing Sheets

METHOD AND MOBILE COMMUNICATIONS SYSTEM FOR CONTROLLING A SHORT MESSAGE SERVICE

CROSS-REFERENCE TO RELATED APPLICATION

This is a continuation of copending International Application PCT/DE99/00899, filed Mar. 24, 1999, which designated the United States.

BACKGROUND OF THE INVENTION

Field of the Invention

The invention relates to a method and a mobile communications system for controlling a short message service.

The short message service enables a mobile subscriber of a mobile radio network to transmit and to receive alphanumeric messages via his mobile station. Each mobile subscriber is registered with his data and services in a subscriber database (i.e. a home location register (HLR)) of the mobile radio network, in which configuration a corresponding billing information item must also be present for using the short message service. One or more short messages are sent by a communication terminal of the mobile subscriber of the mobile radio network (mobile subscriber A) to another subscriber (mobile subscriber B) and is usually temporarily stored in service facilities provided for the short message service (short message service center). There are usually a number of service facilities containing temporarily stored short messages.

In the mobile radio networks, the network operators are currently not able to block certain service facilities for their own subscribers. Therefore, any mobile subscriber can send his short messages via any service facility via his communication terminal. A network operator who provides his subscribers with their own service facility cannot prevent these subscribers from using the service facilities of another network operator, thus burdening him with costs for using the foreign network facility.

In International Patent Disclosure WO 95/12292 it is disclosed to send short messages both via the short message service center (SMSC) of the sender of the short messages and via the SMSC of the receiver of the short messages, in which configuration a receiver SMSC address can be stored in the HLR so that the SM sender does not need to know this information himself. Since the SMSC address is sent from a HLR to a mobile switching center (MSC) forwarding the SM, no storage of SMSC addresses in a list of the MSC is provided in the configuration.

SUMMARY OF THE INVENTION

It is accordingly an object of the invention to provide a method and a mobile communications system for controlling a short message service that overcome the above-mentioned disadvantages of the prior art methods and devices of this general type, in which the control of the short message service can be improved to the advantage of the network operator of a mobile radio network, and in which the short messages are prevented from being routed from the communication terminal or, respectively, mobile radio subscriber to arbitrary service facilities—especially in foreign and possibly costly networks.

With the foregoing and other objects in view there is provided, in accordance with the invention, a method for controlling a short message service in a mobile communications system. The method includes the steps of:

a) sending a short message into a mobile radio network using a first communication terminal of a first mobile subscriber;

b) routing the short message to a switching facility responsible for the first mobile subscriber, an address identifying a service facility responsible for dealing with a short message service for the first mobile subscriber is received together with the short message in the switching facility; and c) routing the short message to the service facility for temporary storage and for transmission to a second communication terminal of a second mobile subscriber if the address received is contained in an address table of the switching facility.

On the basis of the fact that the short messages can be sent into the mobile radio network via the communication terminal of the mobile subscriber and are routed to the switching facility responsible for the mobile subscriber, the subject-matter of the invention provides that, together with the short messages, an address which identifies the service facility responsible for dealing with the short message service for the mobile subscriber is received by the switching facility. The short messages are then routed for temporary storage in the service facility and for transmission to a communication terminal of another subscriber if the received address is contained in an address table of the switching facility.

This prevents the short messages being routed from the communication terminal or mobile subscriber, respectively, to arbitrary service facilities—especially in foreign and possibly costly networks. Using the address table and the evaluation of the service facility address received in each case from the terminal makes it possible to achieve by a simple and economic manner that, for example, only the inexpensive service facility installed by the network operator for his subscribers is used but other service facilities are blocked for its own subscribers.

It has been found to be particularly advantageous if all addresses of the service facilities provided for dealing with the short message service are entered in the address table. This makes it possible to determine both internal and foreign network service facilities for dealing with the short message service, which results in additional flexibility for the network operator and the subscriber.

A particularly advantageous variant of the invention provides that the addresses of the service facilities are entered into the address table in a subscriber-related manner. The blocking or, respectively, releasing of service facility addresses can thus be done in a subscriber-related manner, i.e. the mobile subscribers which are only temporarily in a visited mobile radio network (as roaming subscribers) are allowed access to the service facilities in their home mobile radio network in a subscriber-related manner whereas it remains blocked to its own subscribers.

The addresses of the service facilities for the mobile subscribers are preferably in each case administered individually in a central subscriber database of his home mobile radio network and, if the subscriber changes his location, are loaded into a decentralized subscriber database associated with the switching facility which is currently responsible.

According to another preferred further development of the invention, only the addresses of the service facilities belonging to the network are individually entered in the central subscriber database for the mobile subscribers of a mobile radio network. As a result, the addresses of usable service facilities can be distinguished from the addresses of service facilities that are not available and can be used for routing the short messages to a suitable service facility.

According to an advantageous further development of the invention, the addresses entered in the address table thus also contain addresses of service facilities which are disposed outside the home mobile radio network—for example an address of the service facility disposed in a visited mobile radio network.

The switching facility preferably performs a comparison of the received address with the addresses entered in the address table with respect to address identity before routing the short messages.

It is also of advantage if, in the case where the received address is not entered in the address table, an information item on the non-deliverability of the short messages is generated by the switching facility and sent back to the communication terminal of the mobile subscriber.

The mobile communications system according to the invention exhibits, in addition to the communication terminal of the mobile subscriber which sends short messages into a mobile radio network, the switching facility responsible for the mobile subscriber for receiving the short messages and the address which identifies a service facility responsible for dealing with the short message service for the mobile subscriber. In addition, a control unit that routes the short messages for temporary storage in the service facility and for transmission to a communication terminal of another subscriber if the received address is contained in an address table of the switching facility are also provided in the switching facility.

Other features which are considered as characteristic for the invention are set forth in the appended claims.

Although the invention is illustrated and described herein as embodied in a method and a mobile communications system for controlling a short message service, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
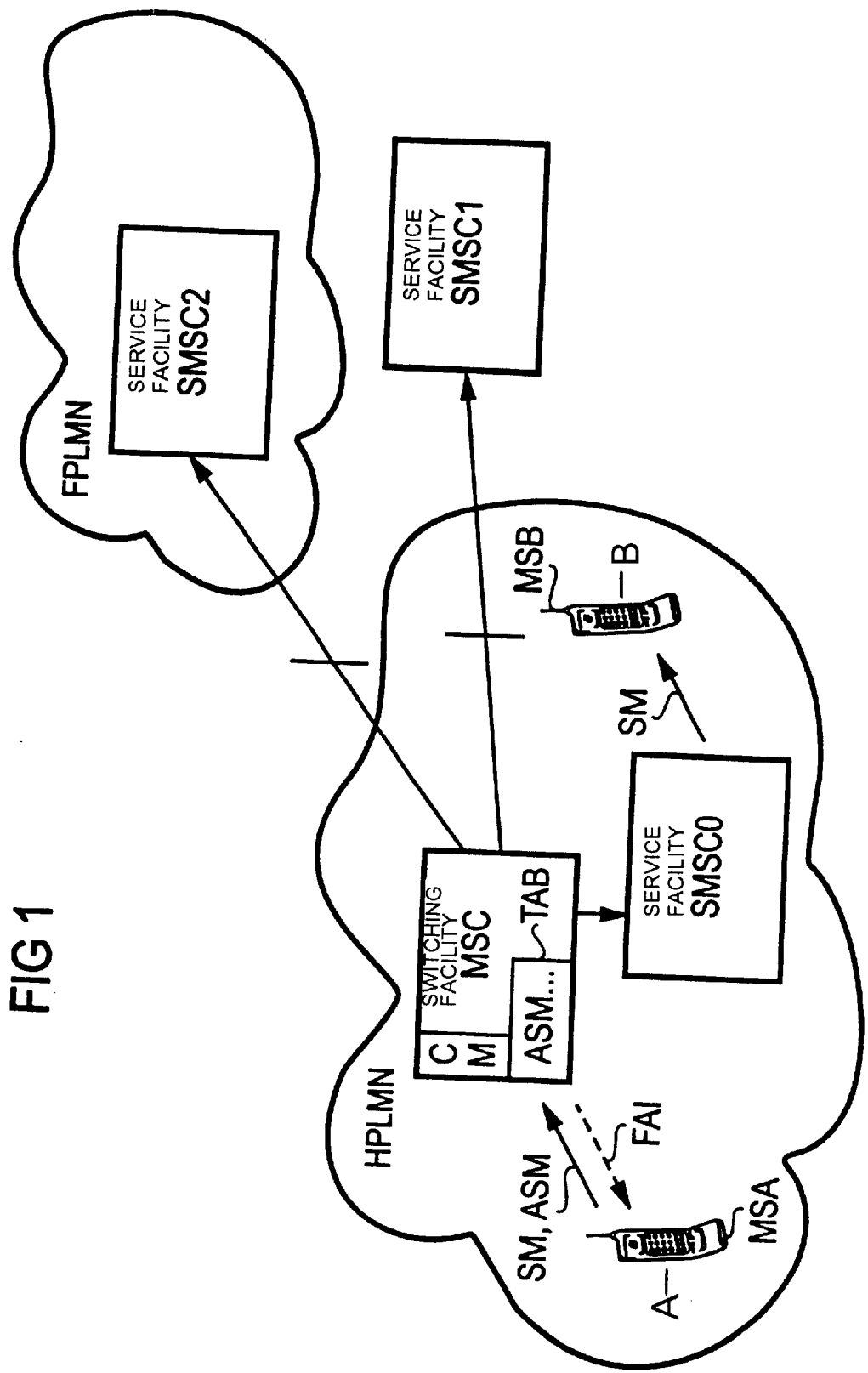
FIG. 1 is a block diagram of a mobile communications system for controlling a short message service in a first embodiment according to the invention.

In all the figures of the drawing, sub-features and integral parts that correspond to one another bear the same reference symbol in each case. Referring now to the figures of the drawing in detail and first, particularly, to FIG. 1 thereof, there is shown a mobile subscriber who is currently located in his home mobile radio network and can send and receive short messages according to a short message service known per se. In controlling the short message service, short messages SM are generated by the mobile subscriber A via his communication terminal MSA—a mobile station MSA in the present example—and sent out to a communication terminal MSB of another subscriber B—also using a mobile station MSB in the present example. The prerequisite for sending and receiving the short messages SM is, on the one hand, an authorization of the mobile subscriber for using the short message service and the availability of the mobile station in dependence on his location in the respective mobile radio network. However, the short messages SM sent by the mobile subscriber A can also be received by a subscriber of a line-connected communication network—e.g. an integrated services digital network (ISDN) subscriber—or by a subscriber of a cordless communication network—e.g. a digital European cordless telecommunications (DECT) subscriber—via corresponding communication terminals.

In the example, it is also assumed that the mobile subscribers A and B are located in the same mobile radio network HPLMN and are registered in subscriber databases. The mobile radio network HPLMN has base stations which belong to the technical radio subsystem of the mobile radio network and communicate with the mobile stations MSA, MSB via an air interface. The technical radio subsystem of the mobile radio network HPLMN also has base station controllers which handle technical radio control functions and in each case communicate with a number of base stations. Each base station controller is connected via an interface to at least one switching facility (i.e. a mobile switching center (MSC)) in the mobile radio network HPLMN, the area of responsibility of which also includes the mobile station MSA of the mobile subscriber. The switching facility MSC is usually associated with a decentralized subscriber database—the visitor location register—for storing and administering the subscriber data of mobile subscribers for the duration of their respective stay within the area of responsibility. To deal with the short message service, the switching facility MSC handles technical switching functions such as the routing of the incoming short messages SM to a service facility connected to it, e.g. to a service facility SMSC0 of the network (SMS mobile switching center) in the present example. The service facility SMSC0 temporarily stores the short messages coming from the switching facility MSC before they are sent to the communication terminal MSB via a base station of the technical radio subsystem responsible for the mobile subscriber.

The switching facility MSC exhibits an address table TAB in which all addresses ASM . . . of the service facilities SMSC0 . . . provided for dealing with the short message service are entered. In the present example, the switching facility MSC receives, together with the short messages SM, an address ASM which is administered by the communication terminal MSA as the service facility suitable for the mobile subscriber. If this address ASM is present in the table TAB, as shown, which is determined by a controller CM in the switching facility MSC, preferably by a simple address comparison, the short message service will be dealt with by the service facility identified. In the example, the controller CM initiates the routing of the short messages SM to the service facility SMSC0 identified by the address ASM, which temporarily stores the incoming short messages SM and forwards them to the communication terminal MSB of the destination subscriber at a later time.

In the case where the received address ASM is not entered in the address table TAB, the controller CM of the switching facility MSC generates an information item FAI on the non-deliverability of the short messages SM and sends it back to the communication terminal MSA of the mobile subscriber. If the received address ASM, however, corresponds to another address of a service facility which is entered in the address table TAB, the received short messages SM will be routed to the service facility and from there to the mobile subscriber terminal MSB. In the present example, two other service facilities SMSC1, SMSC2 are identified, of which one service facility SMSC2 is disposed in another mobile radio network FPLMN which represents a visited mobile radio network if the mobile subscriber terminal MSA roams into this network, and the other service facility SMSC1 is disposed as an individual network node without being tied to one of the mobile radio networks HPLMN, FPLMN.

In this manner, the short messages SM, after being compared by the address table TAB in the switching facility MSC, are only forwarded to the service facilities having a table entry. The table entries, e.g. ASM . . . for identifying the service facility SMSC0 . . . for dealing with the short messages SM of its mobile subscribers can be set up at any time, and changed again, by the network operator of the mobile radio network HPLMN by an appropriate access to the switching facility MSC. The mobile subscriber of a network operator A can thus administer the address of a service facility of a network operator B as subscriber data and send out short messages via this service facility of the network operator B and/or via the service facility of network operator A.

In the case where the switching facility MSC is linked to a service control point, the short message service is correspondingly also dealt with, according to the invention, for IN services (intelligent network), for example for the pre-paid service in which the signaling extends from the communication terminal via the switching facility MSC to the service control point of the intelligent network.

Figure 2:
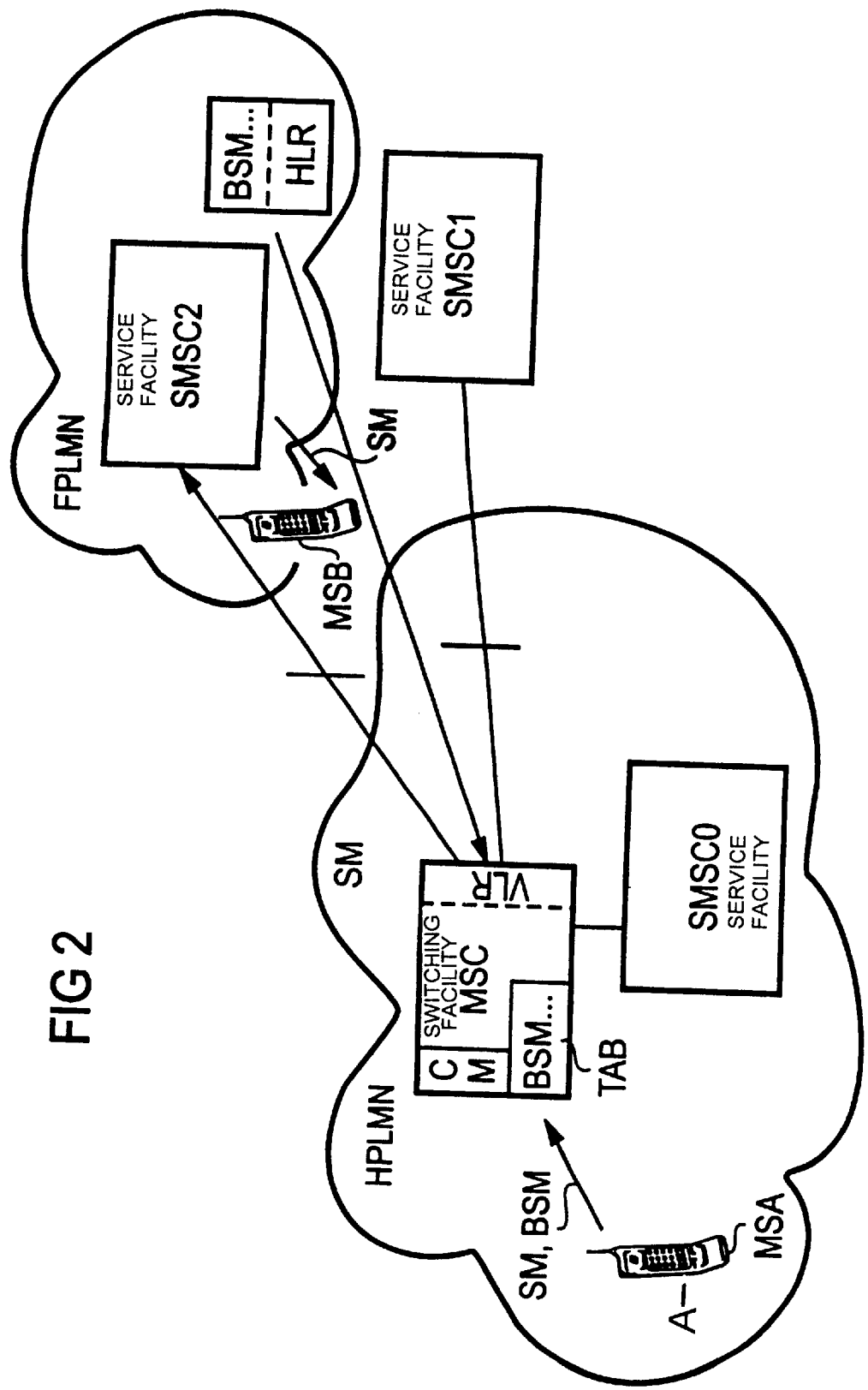
FIG. 2 is a block diagram of the mobile communications system for controlling the short message service in a second embodiment.

FIG. 2 shows an alternative variant of the invention in which addresses BSM of the service facilities which are suitable and can be selected for dealing with the short message service are entered in the address table TAB of the switching facility MSC in a subscriber-related manner. It is assumed that, from the point of view of the mobile subscriber A with his mobile station MSA, the mobile radio network HPLMN represents the visited mobile radio network in which he is temporarily located, and the mobile radio network FPLMN represents his home mobile radio network. The second mobile subscriber B is located in the home mobile radio network FPLMN with his mobile station MSB. The mobile subscriber A moving within the mobile radio network HPLMN sends the short messages SM via his mobile station MSA to the switching facility MSC with the connected visitor location register VLR, which is currently looking after him. In this configuration, the mobile station MSA adds an address BSM of the service facility located in his home mobile radio network FPLMN, for example the service facility SMSC2. Before the switching facility MSC routes the short messages SM to the correct service facility, it checks by an address comparison whether the table entries in the table TAB contain the address BAM.

So that roaming mobile subscribers A can also access internal network service facilities of the home mobile radio network FPLMN for delivering the short messages from the visited mobile radio network HPLMN, the addresses of suitable service facilities for these mobile subscribers are individually administered in a central subscriber database HLR—the home location register—of the home mobile radio network FPLMN. In the present example, the subscriber entry in the home location register HLR additionally exhibits, apart from the usual subscriber-related data, one or more addresses BSM of usable service facilities. The address BSM or addresses can also be identical for a number of mobile subscribers. As soon as there is a change of location of the subscriber into a new area of responsibility (location update), a loading process is initiated in which these service facility addresses—e.g. address BSM in this case—are transferred to the visitor location register VLR associated with the switching facility—e.g. MSC—which is currently responsible.

The switching facility MSC—i.e. the controller CM—reads the received addresses—e.g. address BSM in this case—into the table TAB and evaluates it by direct access to the visitor location register VLR. Since the address BSM received from the mobile station MSA and the address BSM stored in the table TAB are identical, the switching facility routes the short messages SM to the addressed service facility SMSC2 in the home mobile radio network FPLMN and then sends them to the mobile subscriber B or, respectively, to mobile station MSB. Due to the fact that it is only internal network service facilities of a mobile radio network which are exclusively individually entered and administered for the mobile subscribers administered in the respective home location register HLR, it is ensured, on the one hand, that these subscribers can also send out short messages in foreign networks and, on the other hand, it is made possible for the mobile subscribers of the foreign mobile radio network to be blocked for these foreign service facilities.

I claim:

1. A method for controlling a short message service in a mobile communications system, which comprises the steps of:

entering into an address table all addresses of all service facilities provided for dealing with the short message service, the addresses entered into the address table also containing addresses of the service facilities disposed outside a home mobile radio network;

sending a short message into a mobile radio network using a first communication terminal of a first mobile subscriber;

routing the short message to a switching facility responsible for the first mobile subscriber, an address identifying a service facility responsible for dealing with a short message service for the first mobile subscriber being received together with the short message in the switching facility; and routing the short message to the service facility for temporary storage and for transmission to a second communication terminal of a second mobile subscriber if the address received is contained in an address table of the switching facility.

2. A method for controlling a short message service in a mobile communications system, which comprises the steps of:

entering into an address table all addresses of all service facilities provided for dealing with the short message service, the addresses entered into the address table also containing addresses of the service facilities disposed outside a home mobile radio network and at least one of the addresses identifying a service facility disposed in a visited mobile radio network;

sending a short message into a mobile radio network using a first communication terminal of a first mobile subscriber;

routing the short message to a switching facility responsible for the first mobile subscriber, an address identifying a service facility responsible for dealing with a short message service for the first mobile subscriber being received together with the short message in the switching facility; and routing the short message to the service facility for temporary storage and for transmission to a second communication terminal of a second mobile subscriber if the address received is contained in an address table of the switching facility.

3. A method for controlling a short message service in a mobile communications system, which comprises the steps of:

sending a short message into a mobile radio network using a first communication terminal of a first mobile subscriber;

routing the short message to a switching facility responsible for the first mobile subscriber, an address identifying a service facility responsible for dealing with a short message service for the first mobile subscriber being received together with the short message in the switching facility;

generating an information item on the non-deliverability of the short message in the switching facility and sending the information item to the first communication terminal of the first mobile subscriber if the address received is not entered in the address table; and routing the short message to the service facility for temporary storage and for transmission to a second communication terminal of a second mobile subscriber if the address received is contained in an address table of the switching facility.

* * * * *

UNITED STATES PATENT AND TRADEMARK OFFICE
CERTIFICATE OF CORRECTION

PATENT NO. : 6,850,768 B2
DATED : February 1, 2005
INVENTOR(S) : Uwe Föll

It is certified that error appears in the above-identified patent and that said Letters Patent is hereby corrected as shown below:

Title page,
Item [30], Foreign Application Priority Data, should read as follows:

-- Jun. 2, 1998      (DE)     .......... 198 24 631
  Nov. 10, 1998    (DE)     .......... 198 51 864 --

Signed and Sealed this

Fifth Day of April, 2005

JON W. DUDAS
*Director of the United States Patent and Trademark Office*